(12) United States Patent
Jiang et al.

(10) Patent No.: US 7,876,496 B2
(45) Date of Patent: Jan. 25, 2011

(54) FREE-SPACE OPTICAL MODULE FOR OPTICAL AMPLIFICATION

(75) Inventors: Youshan Jiang, Fujian (CN); Tao Liu, Fujian (CN)

(73) Assignee: Photop Technologies, Inc., Fuzhou (CN)

( * ) Notice: Subject to any disclaimer, the term of this patent is extended or adjusted under 35 U.S.C. 154(b) by 361 days.

(21) Appl. No.: 12/126,340

(22) Filed: May 23, 2008

(65) Prior Publication Data
US 2009/0290212 A1 Nov. 26, 2009

(51) Int. Cl.
*H04B 10/17* (2006.01)
*G02B 6/34* (2006.01)

(52) U.S. Cl. ............... 359/341.3; 359/333; 359/341.1; 385/39; 385/47; 385/51

(58) Field of Classification Search ............ 359/333, 359/341.1, 341.3; 385/39, 47, 51
See application file for complete search history.

(56) References Cited

U.S. PATENT DOCUMENTS

| | | | |
|---|---|---|---|
| 4,867,518 A | 9/1989 | Stamnitz | |
| 5,140,655 A | 8/1992 | Bergmann | |
| 5,187,760 A | 2/1993 | Huber | |
| 5,299,056 A * | 3/1994 | Kurata et al. | 359/341.1 |
| 5,355,249 A * | 10/1994 | Souda et al. | 359/341.1 |
| 5,457,558 A * | 10/1995 | Yokoyama | 398/181 |
| 5,739,951 A * | 4/1998 | Naganuma | 359/494 |
| 6,115,178 A * | 9/2000 | Naganuma et al. | 359/495 |
| 6,353,497 B1 * | 3/2002 | Zhang et al. | 359/341.1 |
| 6,433,925 B1 * | 8/2002 | Sakano et al. | 359/341.43 |
| 6,643,058 B2 | 11/2003 | Pianciola | |
| 6,765,722 B2 * | 7/2004 | Ye | 359/494 |
| 6,781,749 B2 | 8/2004 | Radic | |
| 6,850,359 B2 | 2/2005 | Hunt | |
| 6,977,769 B2 | 12/2005 | Matsushita | |
| 7,095,554 B2 | 8/2006 | Pianciola | |
| 7,440,163 B1 * | 10/2008 | Zhou et al. | 359/333 |
| 2003/0156792 A1 * | 8/2003 | Lawrence et al. | 385/39 |
| 2005/0078716 A1 * | 4/2005 | Liu | 372/6 |
| 2007/0237459 A1 * | 10/2007 | Watte et al. | 385/39 |

FOREIGN PATENT DOCUMENTS

EP 444694 A2 * 9/1991

* cited by examiner

*Primary Examiner*—Eric Bolda
(74) *Attorney, Agent, or Firm*—Xin Wen

(57) ABSTRACT

An integrated optical-amplification module includes a housing member, a first input optical terminal configured to receive an optical signal, a second input, optical terminal that can receive a pump light, and an output optical terminal that can output a combined optical signal comprising at least a portion of the optical signal and a portion of the pump light. The integrated optical-amplification module also includes an optical combiner fixedly installed relative to the housing member. The optical combiner can receive the pump light and the optical signal and an optical prism fixedly installed relative to the housing member. The optical combiner can merge the pump light and the optical signal to form the combined optical signal. The optical prism can direct at least a portion of the optical signal through free space to the optical combiner.

19 Claims, 3 Drawing Sheets

Forward pumping mode

Backward pumping mode

Bidirectional pumping mode

FREE-SPACE OPTICAL MODULE FOR OPTICAL AMPLIFICATION

BACKGROUND

The present disclosure relates to optical-amplification modules for high-power optical applications.

The invention of optical fiber amplifier is a significant milestone in fiber communication history. Before the appearance of fiber amplifier, the repeaters in fiber communication system had been implemented using opto-electrical and electro-optical transmitters. The optical communication systems were complicated, inefficient, expensive, and sometimes unpredictable. Subsequent research efforts have been devoted to all-optic repeaters such as Raman amplifier, semiconductor amplifier, and Rare-earth doped fiber amplifier. Fiber amplifiers have demonstrated superior performance including high gain, high saturation output power, and low noise levels. These advantages have has made fiber amplifiers key components in fiber communication systems.

Conventional optical fiber amplifiers can be implemented in different pumping configurations. Referring to FIG. 1A, a fiber laser system 100 includes an input optical fiber 11, an isolator 12, an optical coupler 13A, a fiber amplifier 15, another isolator 16, a gain flatting filter device 17, and an output optical fiber 18. The isolator 12, the optical coupler 13A, the fiber amplifier 15, the isolator 16, and the gain flatting filter device 17 can be sequentially coupled by optical fibers. The fiber amplifier 15 can be implemented by an erbium doped fiber. The optical coupler 13A can be implemented by a wavelength division multiplexer (WDM). The input optical fiber 11 is configured to receive a signal laser beam at a wavelength λ1. The optical coupler 13A is coupled to a fiber 14 that is configured to receive a pump laser beam at a wavelength λ2. The fiber amplifier 15 can amplify the signal laser beam using the energy provided by the pump laser beam received from the upstream direction. Since the pump laser beam is coupled into the fiber amplifier 15 from the upstream direction relative to the fiber amplifier 15, the optical coupler 13A can be said to be in a forward pumping mode. The gain flatting filter device 17 is used to flatten or smoothen out signal intensities over a specified wavelength range and to ensure uniform gains in different wavelength channel.

In another laser pumping configuration, referring to FIG. 1B, the fiber laser system 110 includes an optical coupler 13B positioned downstream relative to the fiber amplifier 15. The fiber amplifier 15 can amplify the signal laser beam using the energy provided by the pump laser beam from the downstream direction. The fiber laser system 110 can be said to have a backward pumping mode.

In another laser pumping configuration, referring to FIG. 1C, the fiber laser system 120 includes an optical coupler 13A positioned upstream relative to the fiber amplifier 15 and an optical coupler 13B positioned downstream relative to the fiber amplifier 15. Pump laser beams wavelength λ2 can be respectively coupled in to the optical coupler 13A and the optical coupler 13B via the optical fibers 14A and 14B. The fiber amplifier 15 can amplify the signal laser beam using the energy provided by the pump laser beam received from the optical fiber 14A in the upstream direction, and by the energy provided by the pump laser beam from the optical fiber 14B in the downstream direction. The fiber laser system 120 thus has a bidirectional pumping mode which includes both a forward laser pump and a backward laser pump.

Different optical components in the above described fiber laser systems 100, 110, 120 are typically connected by fiber splicing. Drawbacks of these conventional laser systems include: complex configuration, low reliability due to too many splicing joints, inflexibility, and high cost. These conventional laser systems also suffer large insertion losses. The insertion loss for each fiber joint can be in the range of 0.1-0.2 dB. The described conventional laser systems each have 10 or more fiber joints, which can generate more than 1 dB optical power loss. As fiber network is becoming increasingly more complex, reliability and cost become more important. There is a need for a laser system and/or components for laser systems which are highly reliable, and low cost, and easy to be integrated into an optical device.

SUMMARY

In a general aspect, the present invention relates to an integrated optical-amplification module that includes a housing member; a first input optical terminal that can receive an optical signal; a second input optical terminal that can receive a pump light; an output optical terminal that can output a combined optical signal comprising at least a portion of the optical signal and a portion of the pump light; an optical combiner fixedly installed relative to the housing member, wherein the optical combiner can receive the pump light and the optical signal, wherein the optical combiner can merge the pump light and the optical signal to form the combined optical signal; and an optical prism fixedly installed relative to the housing member and being separated from the optical combiner and the first input optical terminal by free space, wherein the optical prism can receive the optical signal and direct at least a portion of the optical signal to the optical combiner.

In another general aspect, the present invention relates to an integrated optical-amplification module that includes a housing member; a first input optical terminal that can receive a first optical signal; a second input optical terminal that can receive a first pump light; a first output optical terminal that can output a first combined optical signal comprising at least a portion of the first optical signal and a portion of the first pump light; a first optical combiner fixedly installed relative to the housing member, wherein the first optical combiner can receive the pump light and the optical signal wherein the first optical combiner can merge the pump light and the optical signal to form the combined optical signal; a first prism fixedly installed relative to the housing member and being separated from the first optical combiner and the first input optical terminal by free space, wherein the first optical prism can receive the first optical signal and direct at least a portion of the first optical signal to the first optical combiner; a third input optical terminal that can receive a second optical signal; a fourth input optical terminal that can receive a second pump light; a second output optical terminal that can output a second combined optical signal comprising at least a portion of the second optical signal and a portion of the second pump light; a second optical combiner fixedly installed relative to the housing member, wherein the second optical combiner can receive the second pump light and the second optical signal, wherein the second optical combiner can merge the second pump light and the second optical signal to form the second combined optical signal; and a second prism fixedly installed relative to the housing member and being separated from the second optical combiner and the third input optical terminal by free space, wherein the second optical prism can receive the second optical signal and direct at least a portion of the second optical signal to the second optical combiner.

In another general aspect, the present invention relates to an integrated optical-amplification module that includes a housing member; a first optical prism fixedly installed relative to the housing member, wherein the first optical prism can include a first surface configured to receive an optical signal from free space and to allow the optical signal to refract through the first optical prism; and a second surface that can receive a pump light from free space and to merge at least a portion of the optical signal refracted through the first optical prism and at least a portion of the pump light to output an merged light in free space; and an amplifier that can amplify the portion of the optical signal in the merged light in response to the portion of the pump light in the merged light to produce an amplified light.

Implementations of the system may include one or more of the following. The optical signal can travel in free space at least a portion of the distance between the first input optical terminal and the optical prism. The first input optical terminal, the second input optical terminal, and the output optical terminal can be fixed to a same side of the housing member. The integrated optical-amplification module can further include an optical isolator positioned between the first input optical terminal and the optical prism, wherein the optical isolator can substantially uni-directionally pass the optical signal from the first input optical terminal to the optical prism. A surface of the optical prism can be coated with a polarization-insensitive thin film. The integrated optical-amplification module can further include a dual core optical collimator that can direct the pump light from the second input optical terminal to the optical combiner and to direct the combined optical signal from the optical combiner to the output optical terminal. The integrated optical-amplification module can further include a photo detector coupled to the optical prism, wherein the photo detector can capture at least a portion of the optical signal and produce an electric signal in response to the optical signal. Embodiments may include one or more of the following advantages. The disclosed systems and methods provide a compact, integrated, and lower cost optical module for optical-amplification applications. Compared to conventional systems, the disclosed optical-amplification module can have much lower insertion loss, higher reliability, is easier for system integration and modularization, and more convenient for system management and optimization. The disclosed optical-amplification includes an assembly of optical components separated by free space and can meet a wide range of applications. Another advantageous feature of the disclosed systems and methods is that the optical-amplification module can provide loading multiplexing, and flexible management of the optical signal and the pump light.

An advantage of the described integrated optical-amplification module is that it can be used in combination with different types of amplifiers. For example, fiber amplifiers having different doping elements and different lengths can be used to receive the combined optical signal. The optical amplification can be conducted at different wavelengths. Another advantage of the described integrated optical-amplification module is that it is compact and easy to use. The optical prism folds the optical paths to allow the input and output optical terminals to be positioned on the same side of the housing member, which reduces foot print and allow easy handling. Another advantage of the described integrated optical-amplification module is that it is flexible. Multiple of optical-amplification modules can be configured in parallel for separate optical amplifications or connected in series for a common optical amplification. Yet another advantage of the described integrated optical-amplification module is that multiple optical components can be packaged and tested in factory, which eliminates time and cost for assembling and testing during device integration.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Figure 1A:
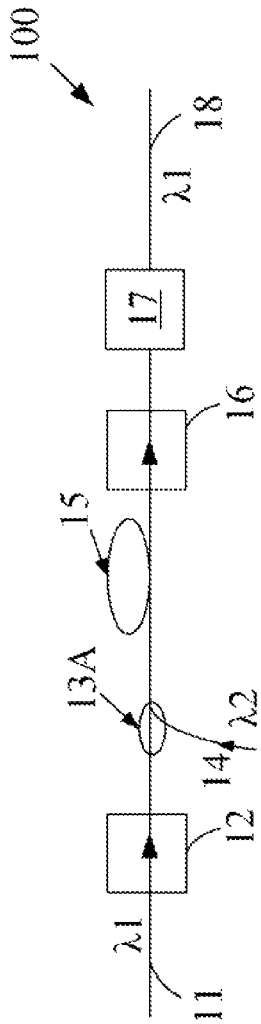
FIGS. 1A-1C are schematic diagrams illustrating pumping configurations in conventional optical fiber amplifiers.
Figure 1B:
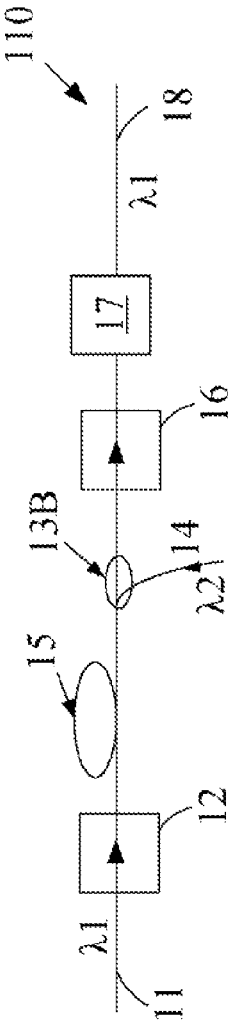
Figure 1C:
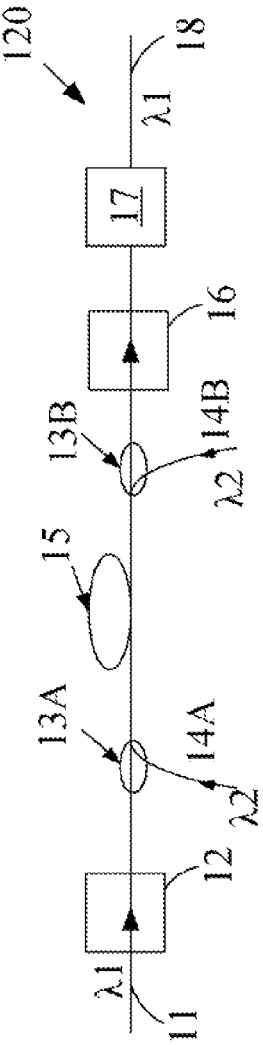
Figure 2:
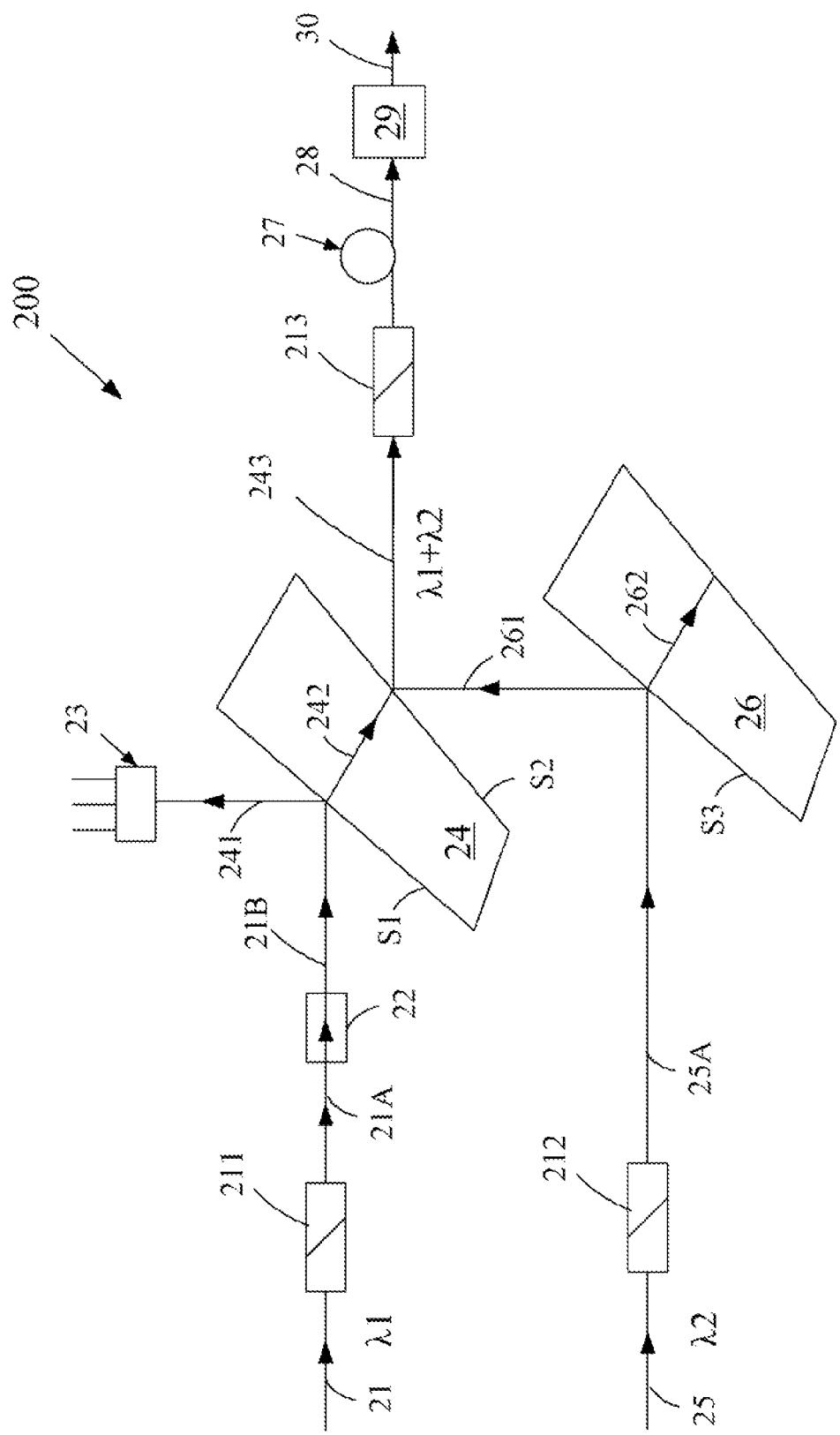
FIG. 2 is a schematic diagram of an optical-amplification module comprising optical components separated by free space.

Referring to FIG. 2, an optical-amplification module 200 includes a collimator 211 configured to receive an optical signal 21 at wavelength $\lambda 1$ and to produce a collimated optical signal 21A. The collimated optical signal 21A passes through an isolator 22 to form optical signal 21B that impinges on an optical multiplexer 24. The isolator 22 can block undesirable backward lights and can minimize the interference between optical components, for example, amplified spontaneous emission (ASE) from an amplifier 27 (as described below) implemented by an erbium doped optical fiber. The optical multiplexer 24 can be implemented by an optical prism coated with films to make it insensitive to polarizations of the incident light, which can thus reduce polarization dependent loss (PDL). For example, surfaces S1 and S2 of the optical multiplexer 24 can be coated with polarization-insensitive films to reduce optical power loss related to directions of the polarizations. The polarization-insensitive films can also be configured to produce desirable splitting ratio between the intensities of the optical signal and pump light. A portion of the optical signal 21B is reflected by surface S1 of the optical multiplexer 24 to produce a reflected light 241. The reflected light 241 can be received by a photo detector 23 that is configured to output an electric signal in response to intensity of the reflected light 241. The photo detector 23 is used monitor the power of the optical signal. Another portion of the optical signal 21B transmits through the optical multiplexer 24 to form a refraction light 242 which transmits surface S2 of the optical multiplexer 24 to form a part of the light 243. The intensities of the reflected light 241 and the refraction light 242 can be set by a predetermined splitting ratio.

A pump light 25 at wavelength $\lambda 2$ is collimated by a collimator 212 to form a collimated pump light 25A that impinges on a optical multiplexer 26. The pump light 25 can for example be a pump laser beam produced by a pump laser. Similar to the optical multiplexer 24, the optical multiplexer 26 can be an optical prism coated with interference films to reduce polarization dependent optical losses. A portion of the collimated pump light 25A transmits through the optical multiplexer 26 as a refracted light 262 which is not used in the amplification of the optical signal 21 and is desirably minimized by proper design of the coating on the surface S3. Another portion of the collimated pump light 25A is reflected by surface S3 of the optical multiplexer 26 to form a reflected pump light 261. The reflected pump light 261 is reflected by surface S2 of the optical multiplexer 24 to form a portion of the light 243. The light 243 thus comprises the optical signal 21 at wavelength λ1 and the pump light 25 at wavelength λ2. In other words, the light 243 is formed by multiplexing the optical signal and the pump light. The light 243 is coupled into an amplifier 27 by a collimator 213. The amplifier 27 can be implemented by an erbium doped optical fiber capable of generating amplified spontaneous emission. The amplifier 27 amplifies the light 243 to form a light 28 which passes through a gain flattening filter (GFF) 29 to form an output light 30. The amplifier 27 can be implemented by for example an erbium doped optical fiber. The gain flattening filter 29 can reduce gain variations across spectral bands at wavelengths.

Two or more of the collimators 211-213, the isolator 22, the optical multiplexers 24, 26, the photo detector 23, and the amplifier 27 can be separated by free space. As described below, one or more of the collimators 211-213, the isolator 22, the optical multiplexers 24, 26, the photo detector 23, and the amplifier 27 can be fixedly assembled in a housing member to form an integrated optical module. In the present invention, the term "free space" refers to a gap filled by air or other uniform medium (such as a gas or a liquid). The optical signal and the pump light can transmit between two or more of the above optical components in free space without the use of optical fibers. Comparing to conventional systems, the elimination of optical fibers for light transmissions between these components can significantly reduce insertion loss related to the coupling or splicing of optical fibers and improve performance. In some embodiments, the insertion loss of more than 1 dB in the conventional laser systems can be prevented. The optical-amplification module can also be miniaturized and reduce cost.

Figure 3:
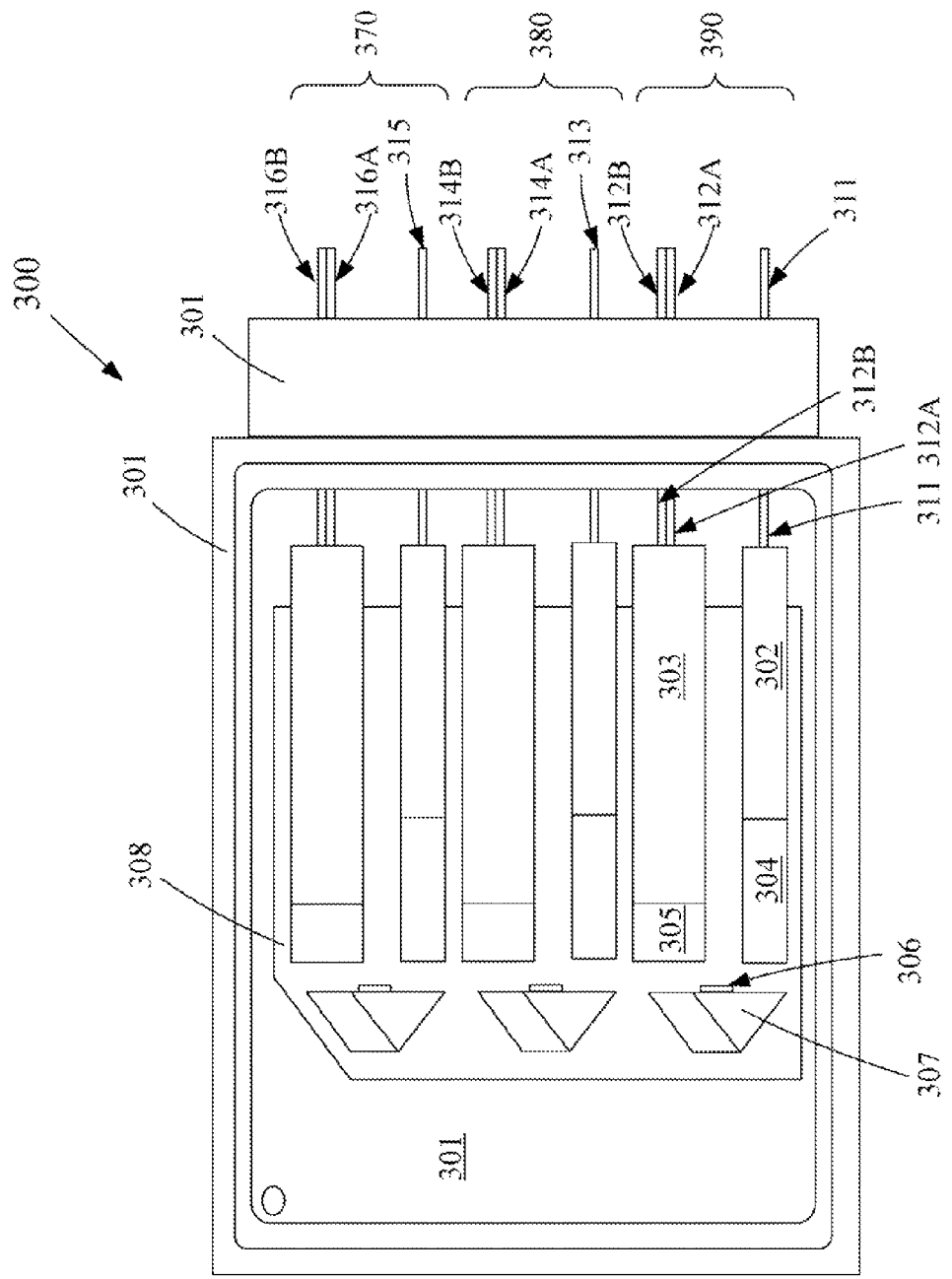
FIG. 3 is a top view of an exemplified layout for an integrated optical-amplification module.

The described optical-amplification module can be assembled in an integrated optical module to reduce footprint, lower cost, and to decrease the time and cost for system integration and testing. Referring to FIG. 3, an integrated optical-amplification module 300 includes optical-amplification modules 370, 380, 390 installed in a rigid housing 301 and on a base 308 fixed to the rigid housing 301. The rigid housing 301 can for example be made of a metallic or a plastic material. The base 308 can be made of a ceramic material. The optical-amplification modules 370, 380, 390 can be used in parallel for separate amplifications of different or the same input optical signals. The optical-amplification modules 370, 380, 390 respectively include optical collimators 311, 313, and 315 for receiving optical signals. The optical collimators 311, 313, and 315 are therefore input optical terminals. The optical-amplification modules 370, 380, 390 also respectively include optical collimators 312A, 314A, and 316A for receiving pump light. The optical-amplification modules 370, 380, 390 also respectively include optical collimators 312B, 314B, and 316B for outputting combined optical signals each including a mixture of the pump light and the optical signal. The optical collimators 311, 313, 315, 312A, 314A, and 316A are input optical terminals. The optical collimators 312B, 314B, and 316B are output optical terminals.

The optical-amplification module 370 includes a single fiber collimator 302, an optical isolator 304, an optical prism 307, a photo detector 306, an optical combiner 305, and a dual fiber collimator 303, which can be fixed to the base 308 by screws or adhesives such as epoxy. The optical prism 307 can be an optical prism coated with films to reduce its dependence on the polarizations of the incident light. The optical collimator 311 can be implemented by an optical fiber that goes through the rigid housing 301 to couple to the single fiber collimator 302. The optical combiner 305 can be implemented by a WDM filter and in some applications, can be a gain flatten filter (GFF).

In operation, an optical signal is coupled into the optical collimator 311 and then into the single fiber collimator 302. The optical signal passes through the optical isolator 304 and is directed to the optical prism 307. The optical signal is reflected by total reflection by the optical prism 307 and to be coupled first into the optical combiner 305. A portion of the optical signal can be coupled into the photo detector 306 for monitoring purpose. The photo detector 306 can produce an electric signal in response to the optical signal.

The optical collimator 312A receives a pump light and couples it into the dual fiber collimator 303. The optical combiner 305 receives the pump light from the dual fiber collimator 303 and the optical signal from the optical prism 307 (in opposite directions, thus backward pump light coupling). The optical combiner 305 combines the pump light and the optical signal to output a combined optical signal first through the dual fiber collimator 303 and then out of the optical collimator 312B. The combined optical signal is input to an external amplifier to generate an amplified light.

The optical-amplification modules 370, 380, 390 can also be used in series, which in combination is used for a single optical amplification. The combined optical signal output from the optical collimator 312B in the optical-amplification module 390 can be fed into the optical collimator 313 in the optical-amplification module 380. Similarly, the combined optical signal output from the optical collimator 314B in the optical-amplification module 380 can be fed into the optical collimator 315 in the optical-amplification module 370.

An advantage of the described integrated optical-amplification module is that it can be used in combination with different types of amplifiers. For example, fiber amplifiers having different doping elements and different lengths can be used to receive the combined optical signal. The optical amplification can be conducted at different wavelengths. Another advantage of the described integrated optical-amplification module is that it is compact and easy to use. The optical prism folds the optical paths to allow the input and output optical terminals to be positioned on the same side of the housing member, which reduces foot print and allow easy handling. Another advantage of the described integrated optical-amplification module is that it is flexible. Multiple of optical-amplification modules can be configured in parallel for separate optical amplifications or connected in series for a common optical amplification. Yet another advantage of the described integrated optical-amplification module is that multiple optical components can be packaged and tested in factory, which eliminates time and cost for assembling and testing during device integration.

It should be understood that the described integrated optical-amplification modules can be implemented in other configurations without deviating from the spirit of the present invention. An integrated optical-amplification module can include one, two, or more optical-amplification modules that each can perform above described functions. One or more amplifiers can be included in the described integrated optical-amplification module. The layout and the materials of the various optical components can differ from the examples described above.

What is claimed is:

1. An integrated optical-amplification module, comprising:

a first optical prism comprising:

a first surface; and a second surface, wherein the first surface is configured to receive the optical signal, wherein the first optical prism is configured to allow the optical signal to enter the bulk of the first optical prism and to exit at the second surface, wherein the second surface is configured to receive the pump light in free space and reflect at least a portion of the pump light in free space, wherein the first optical prism and the direction of the pump light are so configured that the optical signal exiting the first optical prism merges with the pump light reflected by the second surface to form a combined optical signal in free space;

an optical isolator configured to substantially uni-directionally pass the optical signal and send the optical signal across a free space to the first optical prism; and an amplifier configured to receive the combined optical signal in free space and amplify the combined optical signal.

2. The integrated optical-amplification module of claim 1, wherein the refracted optical signal and the pump light in free space are respectively directed to meet at substantially the same location on the second surface of the first optical prism, wherein the pump light reflected by the second surface is along substantially the same direction as the optical signal exiting the second surface.

3. The integrated optical-amplification module of claim 1, further comprising:
a second optical prism having an outer surface configured to reflect at least a portion of a pump light in free space to the first optical prism.

4. The integrated optical-amplification module of claim 1, wherein the first surface and the second surface of the first optical prism are coated with a polarization-insensitive thin film.

5. The integrated optical-amplification module of claim 1, further comprising:
a collimator configured to receive the combined optical signal from the second surface of the first optical prism and send a collimated combined optical signal to the amplifier.

6. The integrated optical-amplification module of claim 1, further comprising a photo detector separated by a free space from the first optical prism, wherein the photo detector is configured to capture at least a portion of the optical signal and produce an electric signal in response to the optical signal.

7. An integrated optical-amplification module, comprising:
a housing member;
a first input optical terminal configured to receive a first optical signal in a first direction;
a second input optical terminal configured to receive a first pump light in the first direction;
a first output optical terminal configured to output a first combined optical signal comprising at least a portion of the first optical signal and a portion of the first pump light in a second direction opposite to the first direction;
a first optical combiner fixedly installed relative to the housing member, wherein the first optical combiner is configured to receive the pump light in the first direction and the optical signal in the second direction, wherein the first optical combiner is configured to merge the pump light and the optical signal to form the combined optical signal; and
a first prism fixedly installed relative to the housing member and being separated from the first optical combiner and the first input optical terminal by free space, wherein the first optical prism is configured to receive the first optical signal in the first direction and direct at least a portion of the first optical signal in the second direction to the first optical combiner.

8. The integrated optical-amplification module of claim 7, further comprising:
a third input optical terminal configured to receive a second optical signal in the first direction;
a fourth input optical terminal configured to receive a second pump light in the first direction;
a second output optical terminal configured to output a second combined optical signal comprising at least a portion of the second optical signal and a portion of the second pump light in the second direction;
a second optical combiner fixedly installed relative to the housing member, wherein the second optical combiner is configured to receive the second pump light in the first direction and the second optical signal in the second direction, wherein the second optical combiner is configured to merge the second pump light and the second optical signal to form the second combined optical signal; and
a second prism fixedly installed relative to the housing member and being separated from the second optical combiner and the third input optical terminal by free space, wherein the second optical prism is configured to receive the second optical signal in the first direction and direct at least a portion of the second optical signal to the second optical combiner in the second direction;
wherein the third input optical terminal is configured to receive the first combined optical signal from the first output optical terminal, wherein at least a portion of the second optical signal is formed by the first combined optical signal.

9. The integrated optical-amplification module of claim 7, wherein the first optical combiner comprises a wavelength division multiplexer filter.

10. The integrated optical-amplification module of claim 7, further comprising:
an optical isolator positioned between the first input optical terminal and the first prism, wherein the optical isolator is configured to substantially uni-directionally pass the optical signal.

11. The integrated optical-amplification module of claim 7, wherein the first input optical terminal, the second input optical terminal, and the first output optical terminal are positioned on a same side of the housing member.

12. The integrated optical-amplification module of claim 7, wherein a first surface of the first optical prism is coated with polarization-insensitive thin films.

13. The integrated optical-amplification module of claim 7, further comprising a dual-core optical collimator configured to direct the first pump light from the second input optical terminal to the first optical combiner along the first direction and to direct the first combined optical signal from the first optical combiner to the first output optical terminal along the second direction.

14. An integrated optical-amplification module, comprising:
a housing member;
a first optical prism fixedly installed relative to the housing member, wherein the first optical prism comprises:
a first surface configured to receive an optical signal from free space and to allow the optical signal to refract through the first optical prism; and
a second surface configured to reflect at least a portion of a pump light from free space and to merge at least a portion of the optical signal refracted through the first optical prism and the reflected pump light to form an merged light in free space;

a photo detector configured to produce an electric signal in response to the optical signal reflected by the first surface of the first optical prism, wherein the first surface is configured to reflect at least a portion of the optical signal in free space to the photo detector; and an amplifier configured to amplify the portion of the optical signal in the merged light in response to the portion of the pump light in the merged light to produce an amplified light.

15. The integrated optical-amplification module of claim 14, wherein at least one of the first surface or the second surface is coated with one or more polarization-insensitive thin films.

16. The integrated optical-amplification module of claim 14, further comprising a second optical prism configured to direct the pump light to the first optical prism.

17. The integrated optical-amplification module of claim 14, further comprising a gain flattener configured to receive the amplified light and to produce an output light, wherein the output light has a more uniform gain in a wavelength range than the amplified light.

18. The integrated optical-amplification module of claim 14, further comprising an isolator configured to pass the optical signal in a forward direction before the optical signal is received by the first optical prism.

19. The integrated optical-amplification module of claim 14, wherein the amplifier is fixedly installed relative to the housing member.

* * * * *